United States Patent [19]

Hayward

[11] 4,112,757
[45] Sep. 12, 1978

[54] FLOWRATE METERS

[75] Inventor: Alan Thomas Joseph Hayward, East Kilbride, Scotland

[73] Assignee: The Secretary of State for Industry in Her Britannic Majesty's Government of the United Kingdom of Great Britain and Northern Ireland, London, England

[21] Appl. No.: 822,577

[22] Filed: Aug. 8, 1977

[30] Foreign Application Priority Data

Aug. 16, 1976 [GB] United Kingdom ............... 34062/76

[51] Int. Cl.² ........................... G01F 1/22; G01F 1/44
[52] U.S. Cl. ........................................ 73/207; 73/213
[58] Field of Search ..................... 73/205 R, 207, 209, 73/210, 213

[56] References Cited
U.S. PATENT DOCUMENTS 1,917,974  7/1933  Inglis et al. ........................ 73/210 X
2,220,496  11/1940  Ringelstetter ........................ 73/210

Primary Examiner—James J. Gill
Attorney, Agent, or Firm—Pollock, Vande Sande and Priddy

[57] ABSTRACT

A fluid flowmeter of the venturi type is disclosed in which a throat is formed between complementary surfaces of a duct and a control member. Relative movement between the duct and the control member in response to the flow of fluid through the meter serves to enlarge the throat as the flow rate increases, and operation over a wide range of flowrates is thereby made possible. A measure of fluid flowrate can be obtained from fluid pressure measurements at the throat and at a position upstream thereof. An advantage over one prior art device is that the throat position remains substantially constant during relative movement of the complementary surfaces, so that sensing of the throat pressure is simplified.

6 Claims, 1 Drawing Figure

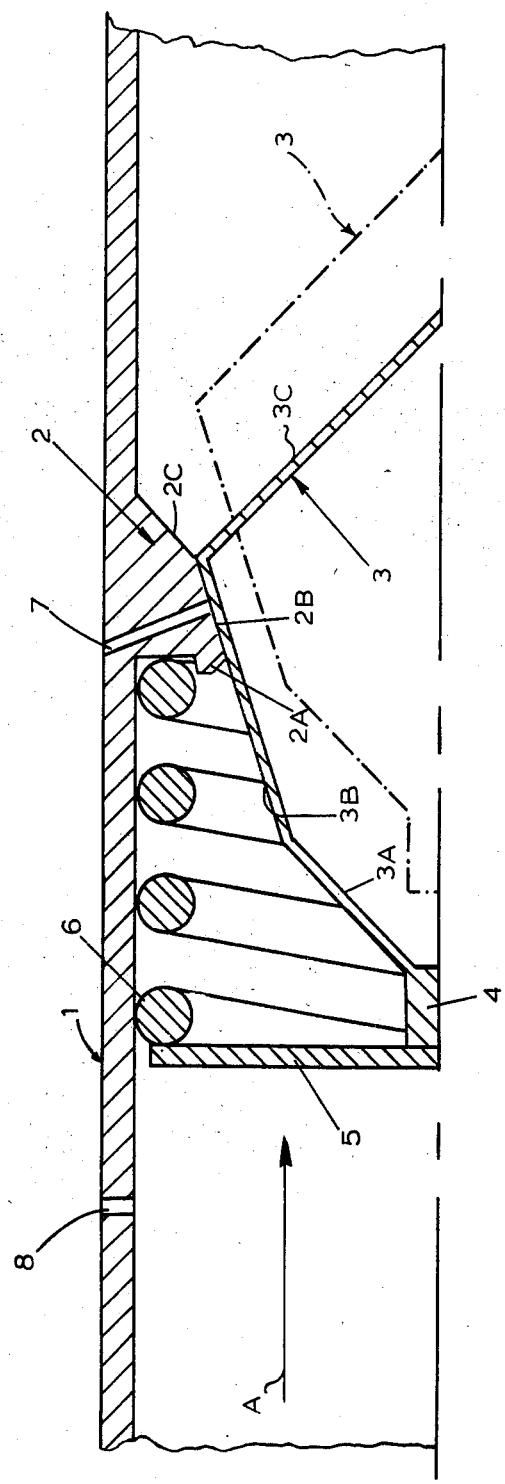

FLOWRATE METERS

The present invention relates to the measurement of fluid flowrate, and in particular the invention relates to means for use in such measurement having the general characteristics of a so-called Venturi meter.

The Venturi meter is a device which has been used in the measurement of fluid flowrate for many years. It comprises a duct having an internal cross-section of convergent-divergent form wherein the fluid of which the flow is to be measured is temporarily accelerated, the acceleration of the fluid causing a reduction of its static pressure which, being measured, leads to a value of flowrate.

The Venturi meter has the advantage over those types of flowrate meters, (notably orifice meters), which necessarily involve the permanent destruction of a significant proportion of the total head of the incident flow, that the convergent and divergent sections of the duct can be designed so as to achieve a smooth acceleration and subsequent deceleration of the fluid, with little generation of turbulence, with the result that the induced pressure loss is largely recoverable.

In British Pat. No. 309,559 it is proposed to provide a Venturi meter in which an annular convergent-divergent flowpath is defined between a duct and a movable control member mounted upon a stationary guide tube coaxially within the duct. The duct is itself of convergent-divergent internal cross-section and the control member is a hollow body of divergent-convergent external cross-section with its maximum diameter corresponding to the diameter of the duct at the juncture of its convergent and divergent sections. In the no-flow condition the control member is spring biased to occupy a position in which its maximum diameter portion coincides with the minimum diameter portion of the duct, but when fluid flows through the duct the consequent differential pressure acting across the control member causes the latter to move downstream upon the guide tube against the action of the spring, the extent to which the control member is displaced being determined by the rate of fluid flow. As the control member is displaced so also is the throat of the annular convergent-divergent flowpath defined between the control member and the duct displaced, (the position of the throat always coinciding with the position of the maximum diameter portion of the control member), and by virtue of the divergent section of the duct the cross-sectional area of the throat increases the more that it is displaced downstream. Thus, the proposed device functions as a Venturi meter in which the size of the throat increases with increasing rates of fluid flow and in this way it is usable in the measurement of considerably wider ranges of fluid flowrates than is the case with a Venturi meter of fixed throat size, (although this is not suggested as such in British Pat. No. 309,559).

However, the above-described device has the particular disadvantage that, by virtue of the movement of the throat with the control member, it is necessary to provide pressure tappings in the wall of the control member, (at its maximum diameter portion), in order to ensure that the static pressure at the throat can be sensed for all positions of the throat, and means must be provided for transmitting this pressure to the exterior of the device which necessarily complicates the construction of the device. In British Pat. No. 309,559 it is proposed to transmit the throat pressure from the interior of the control member to the interior of the guide tube and thence via a support "spider" for the guide tube to the exterior of the device. In order to prevent leakage in the transmission from the movable control member to the stationary guide tube it will in practice be essential to employ sliding seals between these two elements. The fact that the control member moves on a guide at all means that there will necessarily be a certain degree of mechanical friction in the movement of the control member and consequently a certain degree of hysteresis in the performance of the device, but if sufficiently effective sliding seals are also to be employed the friction and consequent hysteresis will be increased quite considerably.

The present invention, on the other hand, resides in means for use in the measurement of the flowrate of a fluid, comprising a duct through which, in use, the fluid of which the flowrate is to be measured flows in a given direction, and a control member mounted within the duct to define with the adjacent portion of the duct a convergent-divergent flowpath for the fluid, the control member and the adjacent portion of the duct comprising adjacent surfaces of complementary form between which the throat of said flowpath is defined, and the control member and the adjacent portion of the duct being relatively displaceable against resilient biasing means in response to the flow of fluid through the duct and to an extent determined by the rate of such flow so that the cross-sectional area of said throat varies with the rate of fluid flow through the duct.

The invention also resides per se in a fluid flowrate meter comprising means as defined above and means sensitive to a chosen variable related to the rate of fluid flow through the duct whereby a measure of such rate can be obtained. The chosen variable is preferably the difference in static pressure measured between the throat of the convergent-divergent flowpath and a station upstream thereof. In such a case a pressure tapping (or where appropriate a piezometer ring of tappings), extending through the wall of the duct in the region of its said adjacent surface will serve for the sensing of the static pressure at the throat for a wide range of relative displacements of the control member and duct. However, it is not an essential feature of the invention that the chosen variable be a pressure difference and a meter can alternatively be provided wherein a measure of flowrate is obtained directly from said relative displacement, many suitable displacement-sensing means being known.

In a preferred embodiment of the invention the control member is mounted within the duct coaxially therewith the define with the adjacent portion of the duct an annular convergent-divergent flowpath for the fluid and said adjacent surfaces of the control member and duct are axially tapered surfaces of like inclination, said relative displacement being in the direction of the commom axis of the control member and duct.

Preferably the said adjacent portion of the duct is fixed relative to the remainder of the duct, and the said control member is moveable for displacement relative to the duct in response to the flow of fluid through the duct. Nevertheless it is also within the scope of the invention for the said adjacent portion of the duct to be movable relative to the remainder of the duct, in response to the flow of fluid through the duct, while the control member is fixed relative to the remainder of the duct; in such a case the movable duct portion can for example be supported by the remainder of the duct structure through flexible bellows.

The invention will now be more particularly described by way of example, with reference to the accompanying drawing wherein one half of a preferred embodiment of the invention is illustrated in longitudinal section, the other half being symmetrical therewith.

Referring to the drawing, there is shown a duct 1 of circular cross-section having a constriction 2 and within which is coaxially mounted a movable control member 3. The intended direction of fluid flow through the duct is indicated by arrow A. The duct constriction 2 comprises an axially convergent surface 2A followed by two axially divergent surfaces 2B and 2C, while the control member 3 is in the form of a closed hollow body comprising two axially divergent surfaces 3A and 3B followed by an axially convergent surface 3C. It will be noted that surface 2B of the constriction 2 and surface 3B of the control member 3 are frusto-conical and of like inclination, and hence of complementary form. The control member 3 is connected by a short rod 4 at its upstream end to a "spider" 5, and between the "spider" and constriction 2 there is constrained a compression coil spring 6. The action of the spring is to bias control member 3 in the upstream direction so that, in the absence of fluid flow through the duct surface 3B of the control member 3 is held in contact with surface 2B of the duct constriction 2, as indicated in full line in the drawing.

When flow occurs in the direction of arrow A the differential pressure acting across the control member 3 causes the latter to move downstream along the axis of the duct 1 against the biasing action of spring 6, the fluid flowing through annular convergent-divergent flowpath defined between the duct 1 and control member 3; the throat of this flowpath is defined between surfaces 2B and 3B of the constriction 2 and control member 3 respectively, and extends along the length of surface 2B. The control member 3 is indicated in a displaced condition in chain line in the drawing. The higher the rate of fluid flow the greater will be the displacement of the control member 3 and it will be appreciated that as the displacement of the control member increases so also will be cross-sectional area of the throat, although by virtue of the complementary form of the surfaces 2B and 3B and the greater axial extent of surface 3B than surface 2B the throat remains in a constant position relative to the duct and its extent remains equal to that of surface 2B; this remains true provided that the upstream edge of surface 3B is not displaced downstream significantly further than the upstream edge of surface 2B, and this extent of displacement accordingly represents the maximum intended operational displacement.

In order to obtain a measure of the rate of flow of fluid passing through the apparatus to static pressure of the fluid at the throat of the convergent-divergent flowpath and at a station upstream thereof is sensed by way of respective pressure tappings 7 and 8 extending through the wall of the duct 1, tapping 7 opening into the throat mid-way along the length of surface 2B. The difference between these two pressures is a function of flowrate which, for liquid flows, may thus be displayed by a suitably calibrated differential pressure gauge, (not shown), connected across tappings 7 and 8; for the metering of gases it is also necessary to measure the absolute pressure and temperature of the upstream station. Tapping 7 may in fact be one of a piezometer ring of interconnected tappings spaced circumferentially around the throat; such an arrangement will average out any pressure fluctuations which may be caused by slight eccentricities in the alignment of the control member. It will be noted that as the throat is defined between two "parallel" divergent surfaces, although its radial width will remain constant throughout its length for any given displacement of the control member its cross-sectional area will necessarily increase throughout its length as a consequence of its increasing mean diameter. However, for apparatus of the configuration illustrated such increase will be small and the flow velocity along the length of the throat should be sufficiently constant to enable stable readings to be obtained at the throat tapping(s) 7.

It is not only the configuration of surfaces 2B and 3B which is important for the efficient functioning of the device. The inclination of the convergent surface 3C of the control member can be somewhat steeper than the inclination of the divergent surface 3B but it should be sufficiently shallow to permit smooth deceleration of the fluid emerging from the throat in order to ensure the minimum of turbulence generation and total head loss at that stage; the inclination of the surface 2C of constriction 2 should be steeper than that of surface 2B to enable the fluid to commence deceleration as soon as it has passed through the throat; and the maximum diameter portion of control member 3, ie the juncture between surfaces 3B and 3C, should be such that the cross-sectional area of the space available for flow between it and the duct wall is at no time less than the cross-sectional area of the throat, to ensure that the flow is not restricted in this space to a greater extent than in the throat. The inclination of the upstream surfaces 2A and 3A of the constriction 2 and control member 3 are not critical as those of the downstream surfaces, and they can conveniently be made steeper than the surfaces 2B and 3B respectively. However, they again should not be so steep or otherwise such as to cause the undue generation of turbulence in the fluid.

It will now be apparent that, in common with the previously described prior art Venturi meter equipped with a movable control member, the device described and illustrated herein is usable in the measurement of considerably wider ranges of fluid flowrates than is the case with a Venturi meter of fixed throat size, while at the same time it overcomes the drawbacks of the prior art meter associated with the movement of the throat relative to the duct. That is to say stationary tapping(s) 7 in the wall of the duct 1 serve to sense the throat pressure for all degrees of displacement of control member 3 and there is a consequently no need to provide pressure tappings in the control member 3 itself; furthermore since there is no guide tube and, more significantly no sliding seals co-operating with the control member 3 the movement of the control member is substantially frictionless and the performance of the device without hysteresis.

There is a still further drawback of the prior art meter which the present device overcomes and this again concerns the nature of the throat. The throat of the device described herein is of a certain length and as indicated above its cross-sectional area is sufficiently constant for stable readings to be obtained at tapping(s) 7. The throat of the prior art meter, however, is of no significant length and in fact is located at a point where a significant change of direction occurs in the flow through the meter; in other words the throat is located at a point of flow instability and as such it is believed that stable pressure readings could not in practice be obtained there.

The range of a meter according to the invention may be comparable with that of a variable orifice meter, examples of which are described in cognate British Pat. No. 1,490,989 . However, it is of note here that the variable orifice meter is a device in which flowrate is deduced by the promotion of a significant total or irrecoverable head loss in the flow whereas the present meter requires the promotion of only a temporary of recoverable head loss, and the irrecoverable head loss induced by the present meter will be substantially less than that induced by a variable orifice meter of the same overall diameter. In other words for equal head loss a meter according to the present invention can be made of smaller diameter than a variable orifice meter. The compactness of construction possible with the present meter means that it will be particularly useful in situations where space is at a premium, for example in the metering of fuel flows in aircraft.

Various modifications to the illustrated embodiment of the invention will occur to those skilled in the art. For example, the spring biasing means exemplified as the single compression coil spring 6 may instead be a tension spring anchored at one end to the control member 3 and anchored at the other end to the duct 1 at some point upstream of the control member, or a combination of tension and compression springs may be employed. In all cases a number of separate springs operating in parallel could be used. Whereas in the illustrated embodiment the control member 3 largely depends upon hydrodynamic forces for its stability when displaced, means may be provided for positively guiding it downstream if required, for example the control member being slidable upon a rod rigidly supported along the axis of the duct; this would act to prevent oscillation of the control member and biasing spring(s) transverse to the duct axis. However, since this would also necessarily involve some mechanical friction in the movement of the control member and consequent hysteresis in the performance of the device such a guide will generally only be employed when absolute concentricity of the control member with the duct is of importance. Damping means such as a dashpot or "pepper pot", may also be provided if required for preventing oscillation in the axial direction.

I claim:

1. A fluid flowrate meter comprising a duct through which, in use, the fluid of which the flowrate is to be measured flows in a given direction;

a control member mounted within the duct to define with the adjacent portion of the duct a convergent-divergent flowpath for the fluid, the control member and the adjacent portion of the duct comprising adjacent surfaces of complementary form between which the throat of said flowpath is defined, resilient biasing means coupled to said control member, the control member and the adjacent portion of the duct being relatively displaceable against said resilient biasing means in response to the flow of fluid through the duct and to an extent determined by the rate of such flow so that the cross-sectional area of said throat varies with the rate of fluid flow through the duct;

and means sensitive to the difference in static pressure between the throat of said convergent-divergent flowpath and a station upstream thereof for obtaining a measure of the rate of fluid flow through the duct.

2. A fluid flowrate meter according to claim 1 comprising a pressure tapping extending through the wall of the duct in the region of its said adjacent surface whereby the static pressure at the throat may be sensed for a wide range of relative displacements of the control member and duct.

3. A fluid flowrate meter according to claim 2 comprising a piezometer ring of tappings extending through the wall of the duct in the region of its said adjacent surface.

4. A fluid flowrate meter according to claim 1 wherein the control member is mounted within the duct coaxially therewith to define with the adjacent portion of the duct an annular convergent-divergent flowpath for the fluid and said adjacent surfaces of the control member and duct are axially tapered surfaces of like inclination, said relative displacement being in the direction of the common axis of the control member and duct.

5. A fluid flowrate meter according to claim 1 wherein the said adjacent portion of the duct is fixed relative to the remainder of the duct, and the said control member is moveable for displacement relative to the duct in response to the flow of fluid through the duct.

6. A fluid flowrate meter comprising a duct having a longitudinal axis through which, in use, the fluid of which the flowrate is to be measured flows in a given direction;

a constriction fixed within the duct 1 said constriction having a surface convergent in the given direction, and downstream thereof an adjacent surface of frusto-conical form divergent in the given direction;

a control member moveable axially of the duct in response to fluid flow through the duct, said control member comprising a surface divergent in the given direction and downstream thereof an adjacent surface convergent in the given direction, said divergent surface being of frusto-conical form and of like cone angle to the said divergent surface of the constriction;

spring biasing means operatively connected between the control member and the duct structure for resiliently opposing downstream movement of the control member;

and pressure tappings extending through the wall of the duct, at least one of said tappings extending also through the constriction to a location on the divergent surface thereof, and at least one other of said tappings extending through the duct wall at a location upstream of the constriction.

* * * * *